May 22, 1928. Re. 16,975
T. G. MARTIN
AUTOMATIC TELEPHONE SYSTEM
Original Filed May 10, 1923 2 Sheets-Sheet 1
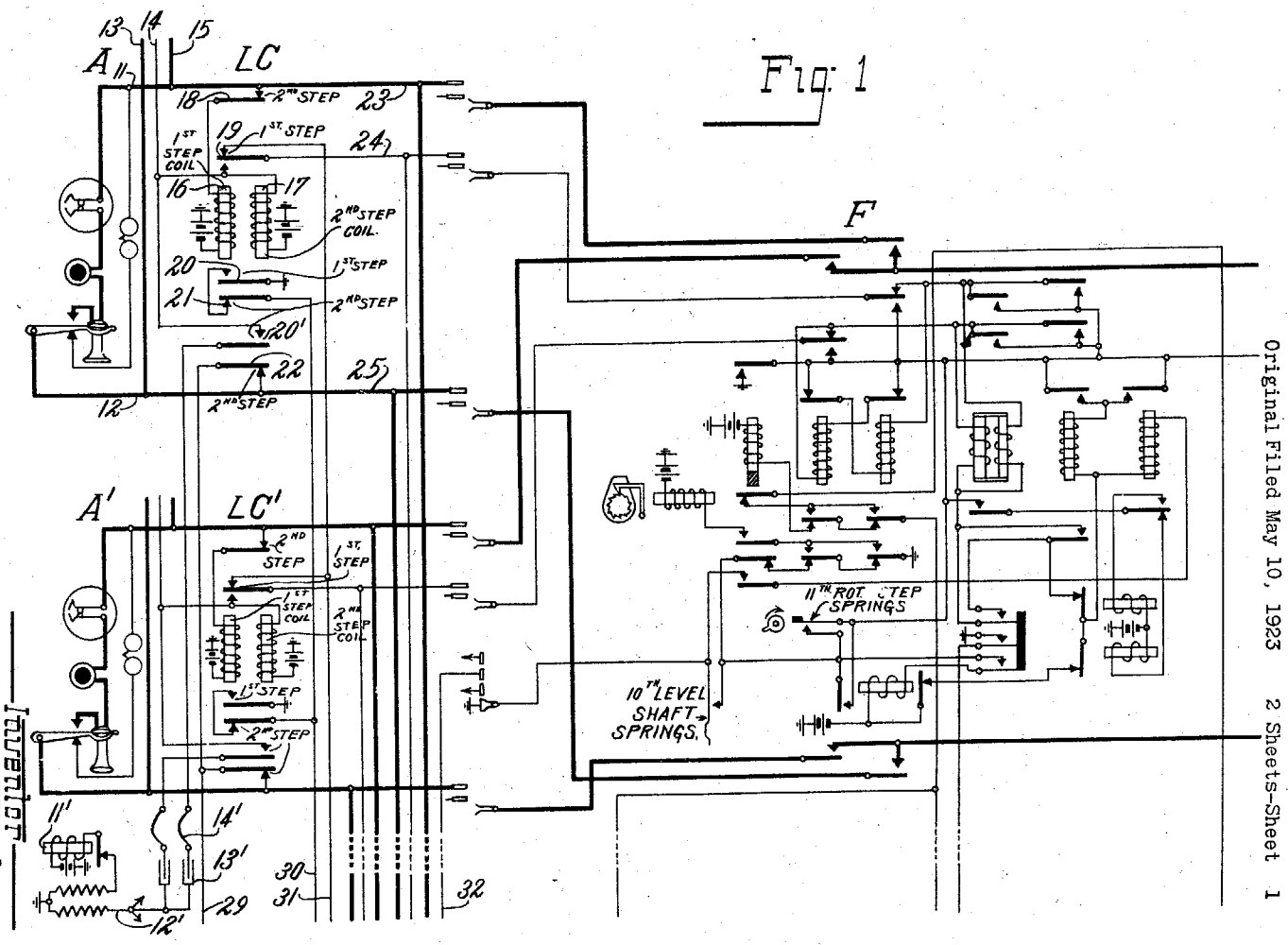
Inventor
Talbot G. Martin
R. S. Richardson Atty.

May 22, 1928. Re. 16,975
T. G. MARTIN
AUTOMATIC TELEPHONE SYSTEM
Original Filed May 10, 1923 2 Sheets-Sheet 2
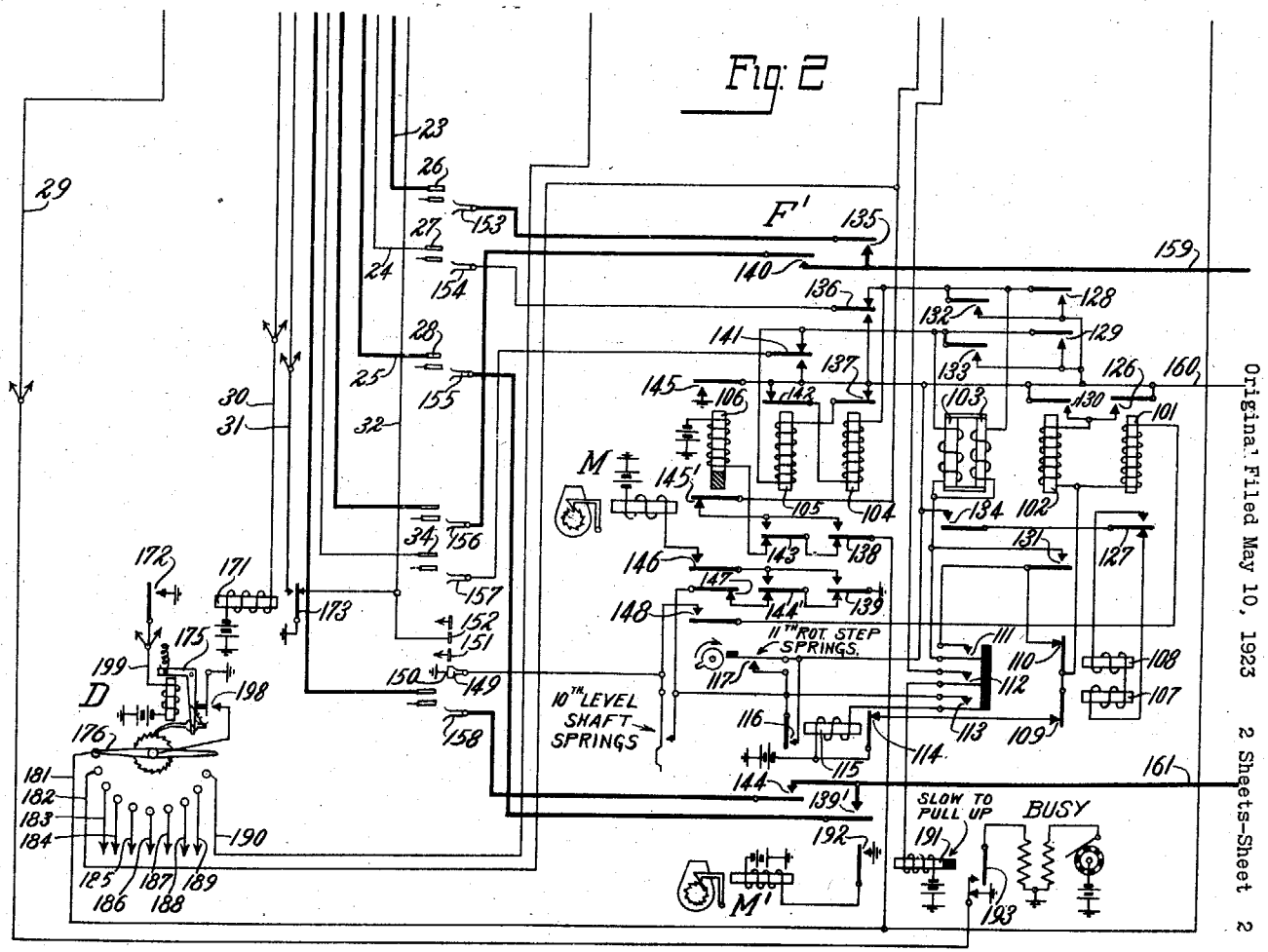
Inventor
Talbot G. Martin
R B Richardson Atty.

Reissued May 22, 1928. Re. 16,975

UNITED STATES PATENT OFFICE.

TALBOT G. MARTIN, OF CHICAGO, ILLINOIS, ASSIGNOR, BY MESNE ASSIGNMENTS, TO AUTOMATIC ELECTRIC INC., OF CHICAGO, ILLINOIS, A CORPORATION OF DELAWARE.

AUTOMATIC TELEPHONE SYSTEM.

Original No. 1,564,487, dated December 8, 1925, Serial No. 637,931, filed May 10, 1923. Application for reissue filed June 11, 1926. Serial No. 115,352.

The present invention relates to automatic telephone systems in general, but is concerned more particularly with telephone systems in which the finder switches are employed; and the principal object is the production of a new and improved finder system which is reliable in operation and which uses finder switches which are simple in construction.

More specifically, an object of the invention is the suitable application of a simple distributer switch to a starting circuit which is looped through a plurality of finder switches. This distributer switch steps ahead after each call and is employed to even up the traffic on the various finder switches and also to enable a calling subscriber to get service eventually even though the starting loop does happen to be open at one or more points or in case one or more finders are out of order.

Another object of the invention is the production of a new and improved finder switch having multiple wipers for increasing its capacity.

Another object is the production of suitable circuit arrangements whereby a discriminating tone source is associated with a subscriber's line at the exchange only when the line is in use.

The other objects are concerned mainly with various circuit details and refinements and will be explained fully hereinafter.

Referring now to the drawings comprising Figs. 1 and 2, they show by means of the usual circuit diagrams a sufficient amount of apparatus in a system embodying the principles of the invention to enable the invention to be thoroughly understood and, in order to be comprehended best, should be placed one above the other.

Figure 1 shows the substations A and A′, of which the respective lines terminate at the exchange in the banks of finder switches, and with which are associated the line circuits LC and LC′, respectively. Fig. 1 shows also the finder F which has access to the lines of substations A and A′, and which is assumed to be associated with a first selector switch through the medium of the three conductors extending to the right-hand edge of the drawing.

Figure 2 shows the common start wire distributer D and also the finder F′ whose banks are multipled with the banks of the finder F.

The finders such as F and F′ are automatic switches of the well-known vertical and rotary type in which the bank contacts are arranged in horizontal rows or levels. Each of these switches has two separate sets of bank contacts and two separate sets of co-operating wipers, in order to double the normal capacity of 100 lines. Each finder also has a vertical test wiper and bank, as shown by Smith and Campbell in Automatic Telephony, second edition, Figs. 65 and 66, pages 68 and 69.

The line circuit LC comprises a two-magnet two-step combination line and cut-off relay whose magnets are indicated by the reference characters 16 and 17. This relay is of the same type as the one disclosed in the co-pending application of Erickson, filed June 17, 1921, Serial No. 478,377, i. e., it has one armature which is operated in two distinct steps, each step controlling a plurality of armature-springs hereinafter referred to as such, or merely as armatures according to standard practice. The line circuit LC′ is identical with the line circuit LC.

The distributer D is mechanically a simple switch having a wiper 176 which is operated in a forward direction only by the associated stepping magnet 174, as will be explained hereinafter.

In order to explain the detailed operation of the equipment shown, it will be assumed that the subscriber at substation A desires to make a call and, accordingly, removes his receiver from the switchhook.

When the receiver is removed at substation A, the first step coil 16 in the line circuit LC is energized over conductors 11 and 12, being connected to conductor 11 through armature 18 and its resting contact, and conductor 12 being grounded through the resting contact of armature 22 and said armature and the common conductor 29, which is grounded through the normally closed contacts controlled by armature 193, Fig. 2. The first step coil 16, upon becoming energized over this circuit, magnetizes the associated core with the result that its armature, as explained in the above mentioned application, is operated only about half way and the first step armature springs 19 and 20 are operated, while the second step armature springs 18, 20′, 21, and 22 remain in their respective normal positions. Armature spring 19, upon being operated, disconnects test conductor 24 from the common conductor 31, and connects it to the second step or cut-off coil 17, and armature 20, upon being attracted, places ground upon the common start conductor 30 through the resting contact of armature 21, and said armature. Upon the ground potential being placed upon the level start conductor 30, the level relay 171, of which there is one for each of the ten levels of the finder banks, energizes; disconnects ground from the vertical test conductor 32 at armature 173, so as to enable the finder which is subsequently started to stop with its wipers opposite the correct level of bank contacts; and at armature 173 places ground on conductor 31, thereby grounding the test contacts of all the lines terminating in this level, with the exception of the test contacts of the line of substation A, which are not grounded owing to the fact that armature 19 of the line circuit LC is operated. As a further result of the energization of the level relay 171, it places ground on start conductor 199, which is common to the ten level relays of which relay 171 is one, thereby closing a circuit for stepping magnet 174 of the distributer D at armature 172. Upon energizing, stepping magnet 174 attracts its armature 175, thereby causing the pawl thereof to be advanced into engagement with the next notch in the associated ratchet wheel, the wiper 176, however, not being moved. As a further result of armature 175 being attracted, it places ground upon wiper 176 at contacts 198, thereby closing a circuit for the line relay of the finder F′ by way of start conductor 181, armature 138 and its resting contact, and armature 143 and its resting contact. Upon energizing, line relay 106 prepares a circuit for the meter M at contacts 146; places ground on release trunk conductor 160 at contacts 145; opens a point in the circuit of release magnet 115 at contacts 147; opens the extension of the start circuit at contacts 145′; and at contacts 148 connects up the vertical test wiper 149, thereby closing the circuit for relay 101, as follows: from ground by way of the normally engaged vertical test contact 150, vertical test wiper 149, contacts 148, relay 101, interrupter contacts 109, and contacts 114 to battery. Relay 101, upon energizing, opens a point in the circuit of the rotary magnet 107, and prepares a circuit for vertical magnet 108 at armature 127, and at contacts 126, closes a circuit for relay 102, which extends from the grounded release trunk conductor 160, and includes contacts 109 and 114. Relay 102, upon energizing, connects the two windings of the shunt field test and stepping relay 103 to the release trunk conductor 160 at contacts 128 and 129; closes a locking circuit for itself at contacts 130; and at contacts 131 completes a circuit for stepping relay 103 as follows: from the grounded release trunk conductor 160, by way of contacts 128 and 129 in multiple, the two windings of relay 103, contacts 131, contacts 110, contacts 109, and contacts 114 to battery. Upon energizing, relay 103 places a shunt around contacts 128 and 129 at contacts 132 and 133, respectively. This however, does not have any utility during the vertical operation. As a further result of the energization of relay 103, it closes a circuit for vertical magnet 108 at contacts 134. This circuit extends from the grounded release trunk conductor 160, and includes armature 127 and its working contact. Vertical magnet 108, upon energizing, raises the wipers 153–158, inclusive, opposite the first level of bank contacts and, near the end of its stroke, opens the interrupter contacts 110, thereby opening the circuit of stepping relay 103. Upon deenergizing, stepping relay 103 opens the circuit of vertical magnet 108 at contacts 134, whereupon vertical magnet 108 deenergizes also and again closes the circuit of stepping relay 103 at interrupter contacts 110. Stepping relay 103 again energizes and in this manner the said stepping relay and vertical magnet 108 operate alternately until the calling level is reached. In this case the calling level is the second level, and when vertical test wiper 149 reaches the second level test contact 152, the circuit of relay 101 is opened, whereupon said relay 101 deenergizes and transfers the operating circuit from the vertical to the rotary magnet. This deenergization of relay 101, it will be understood, occurs at or near the end of the second vertical step and at about the same time as the second deenergization of stepping relay 103.

Upon the first energization of stepping relay 103 after the operating circuit has been transferred to rotary magnet 107, a circuit is closed at contacts 134 for said rotary magnet 107 and it rotates the switch wipers 153–158, inclusive, into engagement with the first set of bank contacts in the second level, also rotating vertical test wiper 149 away from the vertical test bank. Near the end of its stroke, magnet 107 opens at its interrupter contacts 109 the circuit of stepping relay 103 and also the circuit of relay 102. Relay 102 has now performed its last function of giving the initial rotary step and accordingly deenergizes; opens its locking circuit at armature 130; disconnects the two windings of stepping relay 103 from release trunk conductor 160 at contacts 128 and 129; and at contacts 131 opens a point in the circuit of stepping relay 103, which point has been previously shunted by the vertical off normal contacts 111. Stepping relay 103, upon deenergizing, opens the circuit of the rotary magnet 107 at armature 134, whereupon rotary magnet 107 deenergizes and closes its interrupter contacts 109 again.

From this point the operation depends upon whether the contacts in which the calling line terminates are the first set of contacts or some other set. In case they are the first set of contacts, the switch wipers are not rotated any further, and the finder switches through at this point. Assuming that the contacts in which the calling line terminates are in some set other than the first set in the second level, test wipers 154 and 157 engage grounded contacts and, as a result, switching relays 105 and 104 are both short circuited and both windings of the shunt field relay 103 are energized with the result that said relay 103 again attracts its armatures. This results in locking circuits being closed for the two windings of relay 103 at contacts 132 and 133, and also in a circuit for rotary magnet 107 being closed at contacts 134. The said rotary magnet 107 again energizes with the result that the switch wipers are stepped into engagement with the second set of bank contacts, and stepping relay 103 is again deenergized at the end of the stroke of the rotary magnet 107.

This alternate operation of stepping relay 103 and rotary magnet 107 continues as described until the test wiper 154 engages the ungrounded test contact 27. When this occurs, switching relay 104, being no longer short circuited, energizes in series with the right hand winding of stepping relay 103. The shunt field stepping relay 103 is not again energized when the calling set of contacts are reached notwithstanding the fact that a circuit for its left hand winding is closed through wiper 157 and the grounded test contact 34, owing to the fact that the non-energized right hand core serves as a short circuit for the magnetic flux generated in the energized left hand core of the relay. It is true that a small amount of flux is generated in the right hand winding of relay 103, but this flux is not sufficient to operate the armature of the relay owing to the fact that the current through the right hand winding of the relay 103 is limited by the high resistance winding of switching relay 104, through which the circuit of the right hand winding of relay 103 now extends as follows: from the grounded release trunk conductor 160 by way of contacts 142, switching relay 104, right hand winding of stepping relay 103, off normal contacts 111, and contacts 110, 109, and 114 to battery. Upon energizing, switching relay 104 disconnects switching relay 105 at contacts 137; opens another point in the circuit of release magnet 115 and closes a circuit for the meter M through contacts 146 at armature 139; and at armature 138 opens the circuit of the slow acting line relay 106 and prepares to extend the start conductor 181 to the next finder. As a further result of the energization of relay 104, it disconnects the test wiper 154 from the junction of switching relay 104 and the right hand winding of stepping relay 103 at armature 136 and connects it to the grounded release trunk conductor 160, thereby placing ground on the test conductor 24 through the test contact 27. When this occurs, the second step or cut off coil of the line circuit relay becomes energized with the result that the remaining armatures of this relay are operated. Armatures 18 and 22, upon being attracted, remove the normal battery and ground connections from the calling line, and armature 21 removes ground from start conductor 30, whereupon the group relay 171 deenergizes.

Relay 171, upon deenergizing, in addition to removing ground from the common conductor 31 and replacing ground on the group test conductor 32 at armature 173, opens the circuit of stepping magnet 174 at armature 172, whereupon stepping magnet 174 deenergizes and removes ground from wiper 176, at the same time advancing the wiper 176 into engagement with start conductor 182 extending to the second finder. It will now be seen that when the next call comes in, the second finder is employed even though the first finder F′ does happen to become idle in the meantime.

In the finder F′, as a further result of the energization of switching relay 104, the line wipers 153 and 155 are connected up to conductors 159 and 161 at armatures 135 and 139′, respectively. As a result, the numerical switch connected with the finder F′ by the conductors 159–161, inclusive, is prepared for operation in the usual manner and, accordingly, places ground on release trunk conductor 160. This is done, it will be understood, before the slow-acting line relay 106 of the finder F′ has had time to deenergize.

After an interval line relay 106 deenergizes; removes ground from conductor 160 at armature 145, leaving conductor 160 grounded by the associated switch as explained above; extends the starting circuit at armature 145′; opens the circuit of the call meter M at armature 146; closes a point in the release magnet circuit at armature 147; and at armature 148 disconnects relay 101, thereby permitting the said relay 101 to deenergize in case it has again energized in response to the ground potential being replaced on conductor 32 at armature 173, as above described.

After the calling subscriber has completed the desired connection in the usual manner, he replaces his receiver on the switchhook, whereupon the ground potential is removed from conductor 160 in the well-known manner. When this occurs, switching relay 104 of the finder F′ and the cut-off winding 17 of the two-step relay of the line circuit LC deenergize. The deenergization of the winding 17 restores conditions in the line circuit LC to normal, and the deenergization of relay 104 results in the circuit of release magnet 115 being closed as follows: from ground by way of armature 139 and its resting contact, armature 144′ and its resting contact, contacts 147, off-normal contacts 113, and release magnet 115 to battery. Upon energizing, release magnet 115 disconnects battery from the interrupter contacts 109 and 110 of the rotary and vertical magnets 107 and 108, respectively, at contacts 114, so as to prevent relays 101 and 102 from becoming energized over wiper 149 during the release of the connection. As a further result of the energization of release magnet 115, the shaft and wipers of the finder F′ are restored to normal position in the usual manner, and the circuit of release magnet 115, is opened at off-normal contacts 113 by the switch shaft when the latter reaches its normal position.

Assuming that the subscriber at substation A′ makes a call, and assuming further that he does so at a time when the distributer switch D is in the position shown in the drawing and that the finder F′ is idle, the finder F′ is operated in the hereinbefore described manner, with the result that the wipers 153–158, inclusive, are brought into engagement with the contacts in which the lines of substations A and A′ terminate. In this case, since the substation A is not the calling substation, test contact 27 is grounded and switching relay 104 of the finder F′ accordingly remains short circuited. However, since the call is being made from the substation A′, test contact 34 is the one which is ungrounded and, accordingly, switching relay 105 is no longer short-circuited when test wiper 157 arrives upon the said contact 34. That being the case, switching relay 105 energizes in series with the left-hand winding of the shunt field relay 103. Upon energizing, switching relay 105 performs at armatures 143 and 144′ the same operations as were performed at armatures 138 and 139 by switching relay 104; disconnects switching relay 104 at contacts 142; and at armature 141 disconnects test wiper 157 from the junction of its own winding and the left-hand winding of shut field relay 103 and connects it to the grounded release trunk conductor 160, thereby energizing the cut-off winding of the two-step relay of the line circuit LC′.

As a further result of the energization of switching relay 105, it connects up the line wipers 156 and 158 at contacts 140 and 144 to the conductors 159 and 161, with the results hereinbefore described.

It may be stated that in case the lines of substation A and A′ are calling simultaneously, switching relays 104 and 105 both attempt to energize when the finder has found the calling lines. This does not cause any trouble, however, because each opens the circuit of the other and they cannot both pull up. They both buzz for an instant, but due to the fact that they cannot both have absolutely the same adjustment, one relay will fall out of step and permit the other to pull up. The line which is not connected with this time is found by another finder after the starting circuit has been extended to such finder.

It may sometimes occur that a subscriber will remove his receiver to make a call, but will change his mind and replace the receiver on the hook after a finder has started in search of the line and before the line has been found. Assuming that the finder F′ is operating in search of a calling line, and assuming that the calling subscriber replaces his receiver before the level in which his line terminates has been reached, thereby replacing ground on the corresponding contact in the bank of test wiper 149, the finder does not stop when the calling level is reached unless, of course, that level is the tenth, in which case it stops on account of the fact that the switch shaft is not designed to be raised beyond the tenth level. At any rate, in case the tenth level is reached, and if at such time the test wiper 149 is in engagement with a grounded contact, a circuit is closed for release magnet 115 through off-normal contacts 113, upon the closure of the tenth level shaft springs 118. When this occurs, release magnet 115 energizes; locks itself to the grounded release trunk conductor 160 at contacts 116; and at contacts 114 removes battery from the interrupter contacts 109 and 110 so as to stop the operation of vertical magnet 108 by opening the circuit of relay 101 and permitting it to deenergize. The switch does not start to rotate at this time for the reason that the circuit of stepping relay 103 is opened at contacts 114. The switch shaft and wipers are now restored to normal position, and the circuit of release magnet 115 is opened in the usual manner at off-normal contacts 113, whereupon said release magnet 115 deenergizes; opens its contacts 116; and closes its contacts 114, whereupon it is able to immediately start in search of another calling line in case the start conductor extending to it is at this time grounded due to some other line calling.

A similar arrangement is provided for releasing the finder F′ while its start wire is still grounded and in case it fails to find a calling line while rotating. In such case the rotary movement continues until the eleventh rotary step has been taken, at which time the wipers 153–158, inclusive, will have passed one step beyond the last set of bank contacts, and the eleventh rotary step springs 117 are closed, with the result that a circuit is completed for release magnet 115 from the grounded release trunk conductor 160, as a result of which the release magnet 115 energizes and restores the finder to normal.

In case all the finders are busy except one, and assuming the idle finder is the finder F′, the circuit for the slow to energize chain relay 191 is completed at all points except at off-normal contacts 112 and, accordingly, as soon as the finder F′ starts to operate in its vertical movement upon the next call being made, the circuit of chain relay 191 is completed at off-normal contacts 112, and relay 191 energizes; closes a circuit for the meter M′ at contacts 192 so as to register this condition; and at armature 193 places ground through the left-hand winding of the busy tone transformer on the common conductor 29 and removes direct ground therefrom. This is done so as to give a busy tone to a calling subscriber to inform him that no finder is at present available. The relay 191 is made slow to pull up so as to delay the placing of the busy tone on the common conductor 29 until after the finder F′ has had time to find the calling line. Otherwise, the calling subscriber might get a busy signal and hang up even though the finder F′ is searching for his line. This busy signal, of course, is meant only for those who take off their receivers at a time when all the finders are actually busy.

Referring now to Fig. 1, the so-called discriminating tone arrangements provided for in connection with the lines of substations A and A′ will be explained briefly. The buzzer 11′ is constantly operating and induces a tone through the medium of the associated transformer on the common tone conductor 12′. Considering the line of substation A, this tone passes through the condenser 13′ and the jumper 14′ to the normally open contacts 20′ of the line circuit LC. These contacts are closed only when the second step coil 17 is energized and, consequently, when the line of substation A is in actual use, the tone from the buzzer 11′ is placed on the private normal conductor 14 through the contacts 20′, and when a call is extended to a toll recording operator who has means for associating her headset with the release trunk conductor, this tone is heard and indicates the class to which the line of the substation A belongs. For a fuller description of the way in which the tone is listened to by the operator, reference may be had to Fig. 8 and the accompanying description of the United States patent to Ray No. 1,542,958, granted June 23, 1925. Fig. 1 of the drawings in the Ray case shows how any one of a plurality of characteristic tones may be placed on the private normal conductor 13 of the line switch C. The tone lead, however, is normally connected to the private normal conductor and a path is normally provided to battery through the relay 14 and stepping magnet 16. Hence, there is normally a load on the tone producing machine which is very undesirable in a large exchange. It is obvious that since the discriminating tone lead is normally disconnected from the private normal conductor in the present case, a considerable saving in current is effected on account of the fact that the discriminating tone current is thrown out on the private normal conductor of a line only when that line is in use.

There is another and possibly more serious objection to a system in which the discriminating tone is normally connected. It is common practice to provide some lines with tone, and to leave some lines without tone, depending upon the respective classes to which the lines belong. When this is done, it has been found often that the electrostatic capacity between a private normal conductor not otherwise carrying a tone and the various tone carrying private normal conductors in the same or adjacent cables is of such a value that a tone is placed on the nontone carrying private normal conductors by electrostatic induction from those carrying a tone. This induced tone is often strong enough to mislead the operator, thereby defeating the purpose of the discriminating tone arrangement. It was found that this electrostatic induction is effected principally by the private normal conductors of idle lines, and that no appreciable interference is caused by the tone on a private normal conductor when the said conductor is in use, on account of the fact that it is then grounded.

It was found also that the tone placed on idle private normal conductors caused a corresponding tone to appear on adjacent line conductors by electrostatic induction. This, also, is practically eliminated when the private normal conductors are grounded. In the present case, the electrostatic induction is, therefore, not present to any appreciable extent for the reason that the discriminating tone is disconnected from a private normal conductor when the associated line is not in use and is connected to that conductor only when the associated line is in use, at which time the private normal conductor is grounded, thereby preventing the electrostatic induction from taking place at this time.

It is obvious, in any case, that with a private normal conductor grounded, due to being in use a flow of current exists in the conductor and that to a certain extent the tone will be transmitted to adjacent conductors through electromagnetic induction. However, since the amount of discriminating tone current flowing in a grounded private normal conductor is very small, there is no appreciable amount of discriminating tone current transferred in this way.

It will be seen from the foregoing that the applicant has devised a very efficient finder system and one embracing a comparatively large number of calling lines and one which has very reliable means for extending the start circuit, which means comprises the usual chain circuit extending through the finders and, in addition, the distributer switch D which shifts the point of access to the starting circuit after each call. It will be seen also that there is a considerable economy effected in the consumption of discriminating tone current, and that the source of cross tones amongst the private normal conductors is removed as concerns any practical results.

What is claimed is:

1. In a telephone system, a group of lines, a group of finder switches for extending said lines when calling, a loop starting circuit extending through all said finders in series, a line relay in each finder directly controlled over said starting circuit, contacts on each relay for extending said circuit to the next finder, a start wire common to said lines, and a distributer switch intervening between said start wire and said loop circuit by means of which the common start wire can be associated with said loop circuit at a plurality of different points.

2. In a telephone system, a group of lines, a group of finder switches for extending said lines when calling, a loop starting circuit extending through all said finders in series, line and switching relays in each finder, serially related contacts on the said relays in each finder controlling the continuity of said starting circuit, a start wire common to said lines, a start wire individual to each finder switch connected to said loop circuit, and a distributer switch for associating the common start wire with any one of said individual start wires.

3. In a telephone system, a group of lines, a group of finder switches for extending said lines when calling, a loop starting circuit extending through all said finders in series, a start wire common to said lines, a start wire individual to each finder switch connected to said loop circuit, a distributer switch controlled over said common start wire responsive to successive calls, said distributer switch having a stepping magnet, and a circuit including contact springs directly actuated by said magnet for placing starting potentials on said individual start wires successively.

4. In a telephone system, a group of lines, a group of finder switches for extending said lines when calling, a loop starting circuit extending through all said finders in series, a start wire common to said lines, a plurality of start wires connected to said loop circuit at different points, a distributer switch for associating said common start wire with any start wire of said plurality, means for advancing said distributer switch once for each call, and means for preventing such advance in case a succeeding call is made before the preceding call is located.

5. In a telephone system, a group of lines, a group of finder switches for extending said lines when calling, a loop starting circuit extending through all said finders in series, a start wire common to said lines, a plurality of other start wires connected to said loop circuit at different points, a distributer switch controlled over said common start wire responsive to a call to place a starting potential on one of said other start wires, and means for automatically advancing said distributer switch to preselect another of said other start wires when the calling line is found.

6. In a telephone system, a group of lines, a group of finder switches for extending said lines when calling, a start circuit extending through said finders serially over which the said finders may be started one after the other in response to successive calls, a start wire common to said lines, automatic switching means responsive to a call for changing the relation between the common start wire and the said start circuit to insure the starting of a different finder for the next call, and means preventing said switching means from responding to calls which are initiated while one or more other calls are awaiting the action of finders.

7. In a telephone system, a plurality of lines, a finder switch for extending said lines when calling, testing means in said switch for locating a calling line, said testing means comprising two test wipers and a common test relay with circuit connections for testing two of said lines simultaneously, an armature on said test relay for controlling said circuit connections, and a magnetic circuit for said relay adapted to exert an attractive force on said armature only when both of said test wipers encounter non-calling lines.

8. In a telephone system, a plurality of subscribers' lines, a trunk line comprising line conductors and a release trunk conductor, a finder switch for extending a calling one of said lines to said trunk line, a combination line and cut-off relay individual to the calling line for starting said finder, said relay being held energized over said release trunk conductor after the line is found, a machine for generating signalling current capable of producing a tone indicative of the character of the calling line, and contacts on said relay closed when the same is energized for connecting the said machine with said release trunk conductor.

9. In a telephone system, a plurality of groups of lines, a finder switch for extending said lines when calling, each of said groups of lines being divided into two sub-groups, said switch having a primary movement to select a group and a secondary movement to select two calling lines in the selected group, two sets of wipers in said switch corresponding to the two sub-groups, respectively, a secondary test wiper in each set of wipers, a primary test wiper, a double wound stepping relay, means for operating both windings of said stepping relay in multiple under control of said primary test wiper to drive the finder into association with the calling group, and a relay controlled over the primary test wiper to connect the two windings of the stepping relay with the secondary test wipers, respectively, and to connect the impulse generating contacts with the secondary operating magnet, whereby the wipers are driven into engagement with the calling line.

10. In a telephone system, telephone lines of different character, a local conductor for each line, a tone source for certain of said lines, and means actuated by the closure of one of said certain calling lines for connecting its local conductor to said source.

11. In a telephone system, telephone lines of different character, a local conductor for each line, a tone source for certain of said lines, and means actuated by the closure of one of said certain calling lines for connecting its local conductor to said source and for disconnecting the same therefrom upon the opening of the calling line circuit.

12. In a telephone system, telephone lines of different character, a local conductor for each line, a tone source for certain of said lines, means actuated by the closure of one of said certain calling lines for connecting its local conductor to said source and for disconnecting the same therefrom upon the opening of the calling line circuit, an operator's position, means for extending calling lines to said position, and means at said position responsive to said tone current.

13. In a telephone system, telephone lines of different character, a local conductor for each line, a tone source for certain of said lines, means actuated by the closure of one of said certain calling lines for connecting its local conductor to said source, an operator's trunk, means for automatically extending said calling line to said operator's trunk, and inductive means for transferring said tone source from said local conductor to the talking conductors of said operator's trunk.

14. In a telephone system, telephone lines of different character, a local conductor for each line, a tone source for certain of said lines, means actuated by the closure of one of said certain calling lines for connecting its local conductor to said tone source, an operator's trunk, means for automatically extending said calling line to said operator's trunk, a signal therein, means for operating said signal upon said seizure of said trunk, inductive means for transferring said tone source from said local conductor to the talking conductors of said operator's trunk, an operator's telephone, and a key for connecting said trunk to said telephone.

Signed by me at Chicago, Cook County, Illinois, this 2d day of June, 1926.

TALBOT G. MARTIN.